United States Patent [19]
Lazarz et al.

[11] 4,170,540
[45] Oct. 9, 1979

[54] METHOD FOR FORMING MICROPOROUS MEMBRANE MATERIALS

[75] Inventors: Christine A. Lazarz; Edward H. Cook, Jr., both of Niagara Falls, N.Y.; Lesleigh V. Scripa, East Hartford, Conn.

[73] Assignee: Hooker Chemicals & Plastics Corp., Niagara Falls, N.Y.

[21] Appl. No.: 891,987

[22] Filed: Mar. 31, 1978

[51] Int. Cl.$^2$ ............... B29D 27/00; C25B 13/08; C25B 1/26
[52] U.S. Cl. ................... 204/296; 264/49; 264/127; 568/615
[58] Field of Search ................... 264/49, 127; 260/615 BF; 204/296

[56] References Cited

U.S. PATENT DOCUMENTS

| | | | |
|---|---|---|---|
| 2,644,802 | 7/1953 | Lontz | 264/127 X |
| 2,752,321 | 6/1956 | Heller | 264/127 X |
| 2,752,637 | 7/1956 | Walker et al. | 264/127 X |
| 3,054,761 | 9/1962 | Moore et al. | 264/49 X |
| 3,235,636 | 2/1966 | Trimble | 264/127 X |
| 3,281,511 | 10/1966 | Goldsmith | 264/49 |
| 3,391,221 | 7/1968 | Gore et al. | 264/127 X |
| 3,393,151 | 7/1968 | Dolle et al. | 260/615 BF X |
| 3,445,392 | 5/1969 | Gumprecht et al. | 260/615 BF X |
| 3,518,332 | 6/1970 | Sklarchuk et al. | 264/49 |
| 3,528,879 | 9/1970 | Kometani et al. | 264/127 X |
| 3,665,067 | 5/1972 | Hopkin | 264/127 |
| 3,673,292 | 6/1972 | Kock | 264/127 X |
| 3,700,627 | 10/1972 | Miller | 264/127 X |
| 3,715,378 | 2/1973 | Sianesi et al. | 260/615 BF X |
| 3,980,715 | 9/1976 | Szur | 260/615 BF X |
| 4,003,941 | 1/1977 | Crawford et al. | 260/615 BF X |
| 4,049,589 | 9/1977 | Sakane | 264/49 X |
| 4,079,084 | 3/1978 | Houghton | 260/615 BF |
| 4,098,672 | 7/1978 | Riley | 204/296 |
| 4,107,005 | 8/1978 | D'Agostino et al. | 204/296 X |
| 4,116,890 | 9/1978 | Fang | 204/296 X |
| 4,126,535 | 11/1978 | Balko et al. | 204/296 |

FOREIGN PATENT DOCUMENTS 2250718 4/1973 Fed. Rep. of Germany .... 260/615 BF

OTHER PUBLICATIONS

"The Condensed Chemical Dictionary", Eighth Edition, revised by Gessner G. Hawley, New York, Van Nostrand Reinhold, ©1971, p. 958.
DuPont Bulletin, "Zonyl Fluorosurfactants", Wilmington, Del., E. I. Du Pont de Nemours and Co. (Inc.), [Mar. 1977?], 19 pp.

Primary Examiner—Philip Anderson
Attorney, Agent, or Firm—Peter F. Casella; Howard M. Ellis

[57] ABSTRACT

Microporous membrane materials suitable for electrolytic cell utilization are formed from the blend of particulate polytetrafluoroethylene, a dry pore forming particulate material, and an organic lubricant. The materials are milled and formed into a sheet, which is rolled to the desired thickness, sintered, and subjected to leaching of the pore forming materials.

20 Claims, No Drawings

METHOD FOR FORMING MICROPOROUS MEMBRANE MATERIALS

BACKGROUND OF THE INVENTION

Chlorine is produced almost entirely by electrolytic methods, primarily from aqueous solutions of alkali metal chlorides. In the electrolysis of brines, chlorine is produced at the anode and hydrogen, together with an alkali metal hydroxide, such as sodium or potassium hydroxide, at the cathode. As the anode and cathode products must be kept separate, many cell designs have been developed. These designs have generally utilized either a diaphragm, or a mercury intermediate electrode to separate the anolyte and catholyte products.

In the diaphragm process, brine is fed continuously into the electrolytic cell and flows from the anode compartment through an asbestos diaphragm into the catholyte compartment which contains, for example, an iron cathode. To minimize back-diffusion and migration, the flow rate is always such that only part of the salt is converted. The hydrogen ions are discharged from the solution at the cathode, forming hydrogen gas and leaving hydroxyl ions. This catholyte solution, which contains sodium hydroxide and unchanged sodium chloride, is evaporated to obtain the sodium hydroxide. In the course of the evaporation the sodium chloride precipitates, is separated, redissolved, and sent back into the electrolytic cell. The function of the diaphragm is to maintain the level of concentration of alkali, to minimize the diffusional migration of hydroxyl ions into the anolyte and to maintain separation of hydrogen and chlorine. The diaphragm should also have minimal electrical resistance.

In the mercury electrode process, the cation, after discharge, forms an alloy or analgam with mercury. The amalgam flows or is pumped to a separate chamber in which it is allowed to undergo galvanic reaction, most often with water, to form hydrogen and a comparatively strong sodium hydroxide solution containing almost no sodium chloride.

The diaphragm process is inherently cheaper than the mercury process, but as the former process does not provide chloride-free alkali, additional processing steps are necessary to purify and concentrate the alkali.

Substitution of an ion-exchange membrane material for the diaphragm has been proposed. Numerous membrane materials have been suggested. For example, membranes are described in U.S. Pat. Nos. 2,636,851; 2,967,807; 3,017,338; and British Pat. Nos. 1,184,321 and 1,199,952.

Such membranes are substantially impervious to hydraulic flow. During operation, brine is introduced into the anolyte compartment wherein chlorine is liberated. Then, in the case of a cation permselective membrane, sodium ions are transported across the membrane into the catholyte compartment. The concentration of the relatively pure caustic produced in the catholyte compartment is determined by the amount of water added to this compartment from an external source, and by migration of water, in the cell, i.e. osmosis and/or electroosmosis. While operation of a membrane cell has many theoretical advantages, its commercial application to the production of chlorine and caustic has been hindered owing to the often erratic operating characteristics of the cells. A number of disadvantages have been present when using these membranes, including a relatively high electrical resistance, poor permselectivity and oxidative degeneration, as well as relatively high cost.

As an alternative to asbestos diaphragms and impermeable ion exchange membranes, the industry has sought a suitable porous or microporous plastic diaphragm material. The principle involved consists of producing a thin electrically conductive chemically resistant plastic sheet material having the desired degree of porosity.

Numerous references may be found relating to such membrane materials. Mention may be made more particularly to the following patents which employ techniques of compression preforming followed by fritting, or sintering, or techniques of coagulation of the mixture or the deposition of this mixture on a support.

French Pat. No. 1,491,033, of Aug. 31, 1966, relates to a process for manufacturing porous diaphragms which consists of mixing a solid additive in particulate form into an aqueous dispersion of polytetrafluoroethylene in the presence of particulate inorganic fillers, coagulating the dispersion, placing the resultant coagulum in sheet form, and removing the solid particulate additive from the sheet. The removable particulate additive generally consists of starch or calcium carbonate, and is removable by immersion of the resultant sheet in hydrochloric acid. Alternatively, the additive may also be a plastic polymer which is soluble in an organic solvent, or depolymerizable, or evaporatable upon heating of the sheet. The particulate inorganic fillers which are suitable include barium sulfate, titanium dioxide, and asbestos.

U.S. Pat. No. 3,890,417, issued June 17, 1975, teaches a method of manufacturing a porous diaphragm comprising preparing an aqueous slurry or dispersion comprising polytetrafluoroethylene and a solid particulate additive, thickening of the aqueous slurry or dispersion to effect agglomeration of the solid particles therein, forming a dough-like material containing sufficient water to serve as a lubricant in a subsequent sheet forming operations, forming a sheet of desired thickness, and removing the solid particulate additive from the sheet. The solid particulate additive can be any which is substantially insoluble in water, but which is removable by a suitable chemical or physical means. Examples indicated are starch, and calcium carbonate. U.S. Pat. No. 3,281,511, issued Oct. 25, 1966, discloses preparing microporous polytetrafluoroethylene resin sheets by mixing fine polytetrafluoroethylene powder with a carrier and a readily removable filler material, rolling the thus made dough with intermediate reorientation, so the particles are biaxially oriented. The solvent is then evaporated and the polytetrafluoroethylene is sintered at above its melting temperature, followed by removal of the filler by an appropriate solvent. The carrier material is a readily vaporizable material such as a naphtha or petroleum distillate, such as Stoddard solvent, which is a standard petroleum distillate having a flash point not lower than 100° F., comprised largely of saturated hydrocarbons.

U.S. Pat. No. 3,556,161, issued Jan. 19, 1971, relates to polytetrafluoroethylene sheet materials formed by the "slip-forming" process, comprising mixing polytetrafluoroethylene powder with a liquid such as kerosene, and then sequentially working the resultant composition by the application of concurrent compressive stress and shear stress, the sequence of operations being directed so that the shear stress components are distributed substantially biaxially, resulting in planar orientation in the resulting article. As is the case with the material found by the process of U.S. Pat. No. 3,281,511, the sheet material formed is biaxially oriented, and of high tensile strength.

These and other well known techniques, in the case of membranes rich in polytetrafluoroethylene, have not been capable of producing membranes of satisfactory mechanical properties, i.e. proper porosity, and good wettability.

It is an object of the present invention to provide a novel and improved method of producing microporous separators suitable for electrolytic cells. It is also an object of the invention to provide an improved separator for use in chlor-alkali cells and fuel cells which has a low electrical resistance, and behaves like a porous medium, having a porosity greater than about 70 percent, permitting both the passage of the current and the uniform flow of electrolyte from one compartment of a cell to another.

THE INVENTION

This invention relates to novel polymeric membranes, or separators, the method of making such separators, and the use thereof in electrochemical cells such as a diaphragm type or membrane type chlor-alkali cell.

The electrochemical cells in which the separator described herein to be used are similar to previously used cells, subject to the modifications required for the use of the specific separator. Generally, an enclosure is provided which is divided into catholyte and anolyte compartments by the separator material. In a chlor-alkali diaphragm cell, the catholyte compartment contains an appropriate cathode, generally a metallic material, such as iron. The anolyte compartment contains a conductive electrolytically-active anode, such as graphite, or more desirably, a metallic anode having an valve metal substrate, such as titanium, bearing a coating which contains a precious metal, precious metal oxide or other electrocatalytically active corrosion-resistant material or mixtures thereof. The anolyte compartment may be provided with an outlet for generated chlorine gas, an inlet for brine solution, and an outlet for depleted brine. Similarly, the catholyte compartment may have outlets for liquid caustic and gaseous hydrogen products, and generally, an inlet through which water and/or sodium hydroxide solution may be initially fed. Multi compartment cells may be used which have one or more buffer compartments, and additional separator sheets. Cells may be of conventional diaphragm cell configuration, or, alternatively, may be of the filter-press form, utilizing a plurality of individual frames of suitable material and construction.

In operation, direct current is passed between the electrodes, causing the generation of chlorine at the anode and the selective transport of hydrated sodium ions across the separator into the cathode compartment where they combine with hydroxyl ions formed at the cathode by electrolysis of water.

The improved separator of this invention is a microporous polytetrafluoroethylene material. While other fluorocarbon materials may suitably be used, polytetrafluoroethylene has been found to have the most desired chemical inertness and electrical conductivity for the purpose of the present invention. Suitable fluorocarbon polymers include polytetrafluoroethylene, polytrifluoroethylene, polyvinylfluoride, polyvinylidenefluoride, polychlorotrifluoroethylene, polyfluoroethylene-propylene, polyperfluoroalkoxyethylene, and copolymers thereof. For simplicity of description, the specification will refer to the preferred fluorocarbon polymer, polytetrafluoroethylene.

According to the present invention, a method of manufacturing a microporous diaphragm comprises preparing a dry blend of polytetrafluoroethylene powder and a solid particulate additive. To this dry blend is added sufficient organic fluorosurfactant lubricant to aid in the blending of the polytetrafluoroethylene and the pore former, resulting in a heavy, wet feeling, lumpy powdery mass. This mixture is then put through a rolling mill, where the mixture is allowed to build up on one of the rolls, producing a single sheet having a doughy consistency. Alternatively, the mixture may be extruded, either in sheet form or as a cylinder, prior to milling. This sheet may then be further rolled to the desired thickness. The sheet material, after thinning, is sintered at a temperature above the crystalline melting point of the polytetrafluoroethylene, and after cooling, is subjected to leaching, during which the pore former is dissolved. This yields a microporous separator suitable for use in electrochemical cells.

The preferred lubricant material specified for the present invention is a nonionic fluorosurfactant material having a fluorocarbon chain, $F_3CCF_2CF_2$ . . . Such fluorocarbon surfactants are organic in nature, but due to the presence of the fluorocarbon molecules have a tendency to orient at interfaces, and to lower surface tensions of solutions more readily than hydrocarbon surfactants. Such materials consequently have extremely good wetting action, corresponding to low surface tensions. Further, as a result of the fluorocarbon nature of the material, these fluorosurfactants have a high degree of chemical and thermal stability.

A preferred example of a suitable fluorocarbon surfactant is that marketed under the trademark "Zonyl®" by DuPont. Zonyl® fluorosurfactants are available in a number of forms, including amphoteric and both anionic and cationic, as well as nonionic types, but the nonionic form has been found to be surprisingly superior. Such materials are provided in liquid form, with from 35 to 50% solids in an isopropyl/water diluent. The preferred specific material utilized in the present invention is Zonyl® FSN, a nonionic fluorosurfactant, identified as a fluoroalkyl poly (ethyleneoxy) ethanol. Surprisingly, other varieties of nonionic and cationic, anionic, or amphoteric fluorosurfactants of this nature have been found to be less effective. The fluorosurfactant is present in small concentration, and is utilized to enhance blending of the polytetrafluoroethylene and the solid particulate additive, such as calcium carbonate, to achieve uniformity of blend and to enable ready milling and rolling of the polytetrafluoroethylene composition.

Prior art has cited the use of kerosene as an organic lubricant for similar techniques. Further, the prior art has taught the use of water as the lubricant material. Kerosene has the disadvantage of being dispelled during milling, which introduces a hazard to the milling operation. It has also being found that the use of kerosene limits the amount of milling possible, since the sample becomes stiff and brittle after several passes. It has been found that kerosene does not wet polytetrafluoroethylene readily, which is also a negative factor relative to the use of water as a lubricant. The use of a nonionic organic fluorosurfactant lubricant, which wets polytetrafluoroethylene readily, gives the advantage of unlimited milling, enabling one to assure himself of total uniformity of the finished product. The fluorosurfactant, when used in correct proportions, is not dispelled during milling, and does not create the hazardous milling conditions encountered with kerosene. It has been found that while using keorsene, a static charge builds up during milling and rolling operations. A discharge or spark caused by this static build-up could result in an explosion or rapid burning of the volatile kerosene. In the present invention the lubricant is added as an isopropanol-water solution containing up to 50% by weight of the surfactant, as previously indicated. It is also noted that the amount of lubricant required is relatively low compared to techniques utilizing kerosene, comprising from 5 to 30 percent by weight of the total blend. Preferably, the lubricant comprises from 8 to 25 percent, and more preferably from 18 to 23. Lower percentages of lubricant may be utilized, but may result in more difficult working during subsequent rolling steps. Likewise, higher concentrations may be utilized, but may require provision for subsequent removal.

The solid particulate additive material may preferably be any which is substantially insoluble in water, but which can be removed by a suitable chemical or physical means which will not damage the polytetrafluoroethylene, such as leaching with a mineral acid, e.g. hydrochloric or nitric acids, or by sublimation. Exemplative are starch, for example, maize starch and/or potato starch, or a water insoluble inorganic base or carbonate, such as calcium carbonate, collodial alumina, metallic oxides, etc. Alternatively, water soluble additives may be utilized, such as sodium carbonate, sodium chloride, sodium borate, etc. However, when using such materials the water content of the lubricant should be minimized. Such materials should have a well defined particle size. There is preferably employed a calcium carbonate, formed of particles of an average diameter of between 6.5 and 150 microns. Generally, the additive has particle diameters substantially all of which are within the range of from about 1 to about 500 microns. It has been found that lower average particle diameters will result in increased porosity. The amount of additive utilized will depend on permeability or porosity desired in the final separator. Thus, the weight ratio of pore former to polytetrafluoroethylene may be, for example, from about 10:1 to 1:1, and preferably from about 5:1 to 1:1. It is desired to obtain a porosity of greater than 70 percent, which with prior art techniques was difficult. However, with the present invention, it has been found, possible to readily obtain porosities greater than 70 percent, and even 80 percent without great difficulty.

The polytetrafluoroethylene may have a particle size range of from about 35 microns to about 500 microns or higher. Such material is available from E. I. DuPont de Nemours as, for example, Teflon ® TFE-Fluorocarbon Resin 6A, or Teflon ® TFE-Fluorocarbon 7A. Surprisingly, such low average particle sizes as 35 microns have been found suitable for the present calendering techniques, whereas such materials have previously been used only for molding processes.

In some cases, it may be desirable to incorporate other components in the blend which are not removed when the rolled sheet is treated to remove the particulate additive. Examples of such component could include particulate fillers, generally inorganic materials such as titanium dioxide, barium sulfate, asbestos, graphite, or alumina. Suitably, such fillers have a particle size of, for example, less than 10 microns, and preferably less than 1 micron. It has been found that when utilizing a nonionic fluorosurfactant, in place of kerosene, that the polytetrafluoroethylene/particulate filler blend is much more readily rolled, and will form a sheet relatively quickly. Further, such material is readily milled, blending to uniformity within a relatively low number of passes through a mixer, such as V-blade mixer. After rolling the polytetrafluoroethylene/particulate filler blend to a sheet material, it has been found possible to reduce the number of additional rollings required to obtain a desired thickness. Further, whereas the prior art has suggested multiple rerollings of the sheet material with reorientation of 90° between successive rollings, it has been found that such reorientation and re-rolling may be limited without undue loss of tensile strength. It has been found that excessive reorientation and re-rolling, when utilizing fluorosurfactant lubricants, yields a greater pore size distribution, thus increasing the number of smaller pores, which yields lower efficiency in chlor-alkali cell application due to increased back migration. While the total number of voids is not significantly effected, the relative sizes of the pores are varied. Accordingly, the number of reorientation steps (i.e. repositioning of the sheet at a 90° angle between successive passes through the rollers) should be limited, and in many instances one reorientation is sufficient to yield sufficient biaxial distribution of shear stresses to result in tensile strengths adequate for the proposed use of the sheet. Alternatively, tensile strengths may be improved by laminating or "sandwiching" a plurality of sheets together, in the manner of plywood.

Thus, in accordance with the present invention, it is possible to prepare a uniform blend of fluorocarbon resin and particulate filler in a limited number of blending operations, and to form such blend into a sheet of the desired thickness with a lower number of rolling operations than previously required. Further, the process of the present invention enables the production of successive separators of uniform characteristics and properties, each having similar permeabilities. This is very necessary when using separators for electrolytic cells.

The invention is illustrated in the following examples, in which all parts and percentages are by weight.

EXAMPLES 1–3

Fifty gram of polytetrafluoroethylene powder identified as Teflon ® TFE Powder #6, from E. I. DuPont de Nemours, was blended with 247 grams of calcium carbonate, identified as Drycaflo 225 AB from Sylacauga Calcium Products. The teflon powder had an average diameter of 500 microns, while the calcium carbonate had a nominal size of 12.5 microns. These materials were mixed for one minute in a V-blender, after which the lubricant material was added. For Example 1, fifty milliliters of kerosene was added. For Example 2, twenty five milliliters of Zonyl ® FSN fluorosurfactant was added. For Example 3, 50 milliliters of Zonyl ® FSN fluorosurfactant was added. After addition of the nonionic fluorosurfactant, the blend was mixed for five minutes. The resulting mixture was then rolled between two rolls of a rubber mill. The material was rolled 23 times to achieve a final thickness of 26 to 27 mils thickness, in Example 1. For Example 2, the material was rolled 13 times to a thickness of 18 to 20 mils, while for Example 3 the material was rolled 25 times to a thickness of 11 mils. In Example 1, utilizing kerosene, sparks were observed during thinning operations. Such static charges were not observed using the fluorosurfactant of Examples 2 and 3.

TABLE 1

|   | | Example 1 | Example 2 | Example 3 |
|---|---|---|---|---|
|   | Lubricant | Kerosene | Zonyl FSN | Zonyl FSN |
|   | Amount | 50 mls | 25 mls | 50 mls |
|   | Reference | N.B. NO. 4445 Pages 11–18 | N.B. No. 4445 Pages 32–34 | N.B. No. 4445 Pages 26–31 |
|   | Sample Number | 15-2 | 34-6 | 31-17 |
|   | MILLING STAGE | | | |
| 1. | Prior to milling | Dry blend, small lumps | Semi-dry blend, small lumps | Heavy, wet feeling, small lumps |
| 2. | First pass: ability to form a sheet | Low, sample remains powdery and crumbly, needs much working to form a sheet | Medium, sample mills in small pieces which readily accept sheet form | High, material transforms into a doughy sheet. |
| 3. | Successive thining: ability to mill | Modest, some cracking noted | Modest, some tearing noted | Excellent, mills readily |
| 4. | Ability to cross mill | Low, sample is stiff, difficult to mill as rollers bind | Not cross milled | Excellent, no hesitation in rollers, a uniform sheet results |
| 5. | Ability to mill successive thinning passes | Very low, sample becomes stiff and brittle having a high tendency to break | Medium, sample is flexible, with some tearing of sheet noted along with rough edges | Excellent, no resistance offered to milling, a uniform sheet results |

The sheet materials, after thinning to the indicated thicknesses were dried in stepwise fashion at temperatures from 100° C. to 250° C. progressively, to remove all of the volatile components of the kerosene and fluorosurfactant material. After drying thoroughly, the temperature was gradually increased to a temperature of from 340° to 360° C. to sinter the polytetrafluoroethylene particles. The sintering temperature was maintained for a period of from 90 to 210 minutes. After cooling, the sintered polytetrafluoroethylene sheet was then leached successively with a hydrochloric acid solution and with nitric acid solution to remove the calcium carbonate. After rinsing, and a series of leaching and rinsing steps, the microporous polytetrafluoroethylene separator was tested for porosity by mercury intrusion. Porosities of 80.6, 80.3, and 86.3% were found for Examples 1 thru 3 respectively. These examples demonstrate that equivalent porosities may be obtained utilizing less fluorosurfactant than the kerosene of Example 1, and increased porosity when utilizing the same amount of fluorosurfactant as kerosene, as well as demonstrating improved processing capability.

EXAMPLE 4

The sheet materials formed in accordance with Examples 1–3 were tested in a chlorine cell. The samples were used in a standard two compartment glass mini cell operated between 85° and 95° C. The anolyte was circulated with acidified brine at a pH of 4.0. The catholyte was 100 gram per liter sodium hydroxide. The initial voltage for the cell was determined at 1.5 ASI and the indicated caustic strengths. The cell was operated, and the cell voltage determined at various times, and current efficiency calculated. The results of this experiment are illustrated in Table 2.

TABLE 2

|   | 120 gpl. NaOH | | 150 gpl. NaOH | |
|---|---|---|---|---|
|   | % CCE | Voltage | % CCE | Voltage |
| Ex. 1 | 82.5 | 3.95 | 69.0 | 3.80 |
| Ex. 2 | 80.5 | 3.47 | 68.0 | 3.42 |

TABLE 2-continued

|   | 120 gpl. NaOH | | 150 gpl. NaOH | |
|---|---|---|---|---|
|   | % CCE | Voltage | % CCE | Voltage |
| Ex. 3 | 63.5 | 3.26 | 43.0 | 3.27 |

EXAMPLES 5–7

Fifty grams of polytetrafluoroethylene powder identified as Teflon ® TFE-Fluorocarbon Resin 7A, from E. I. DuPont de Nemours, were blended with calcium carbonate and varying amounts of Zonyl ® FSN-Fluorosurfactant. The calcium carbonate had a particle size range of from 61 to 74 microns, while the PTFE had an average particle size of 35 microns. Porosities were measured for Examples 5 and 6, and all samples were tested in a glass mini-cell as set forth by Example 4. The results of these tests are set forth in Table 3.

TABLE 3

|   | Example 5 | Example 6 | Example 7 |
|---|---|---|---|
| Reference | N.B. No 4445 pages 86–90 | N.B. No 4445 pages 52–56 | N.B. No 4445 pages 47–51 |
| Sample No. | 90-16 | 56-30 | 51-20 |
| Zonyl ® FSN | 65 mls | 75 mls | 100 mls |
| Calcium Carbonate | 309 g | 247 g | 247 g |
| PTFE | 50 g | 50 g | 50 g |
| Milling Steps | 23 | 19 | 21 |
| Thickness | 15 mil | 19 mil | 8 mil |
| Porosity, % | 86.95 | 84.6 | — |
| CCE at 120 gpl NaOH | 81.5 | 87.0 | 73.5 |
| Voltage at 120 gpl NaOH | 3.70 | 4.05 | 3.45 |
| CCE at 150 gpl NaOH | 67.5 | 77.0 | 61.0 |
| Voltage at 150 gpl NaOH | 3.70 | 4.02 | 3.46 |

EXAMPLES 8–13

Additional membranes were prepared by the technique of Examples 1–3, utilizing a variety of different lubricants, as set forth in Table 4. Fifty grams of Teflon ® TFE-Fluorocarbon Resin 6, were blended with 247 grams of Drycaflo 225 AB unscreened calcium carbonate. The lubricants utilized were:

Examples 8-9: Zonyl ® FSB, an amphoteric fluorosurfactant identified as a fluoroalkyl substituted betaine;

Examples 10: Zonyl ® FSC, a cationic tertiary amine identified as dimethyl sulfate quarternized fluoroalkyl substituted;

Example 11: Zonyl ® FSP, an anionic fluorosurfactant, identified as fluoroalkyl phsophate, ammonium salt;

Example 12: Triton ® X-100 phenoxy polyethoxy ethanol surfactant available from Rohm & Haas, Inc.

For comparison, the results are illustrated in Table 4, with previous Example 3, to demonstrate the unexpected improvement obtained by the use of the specific nonionic fluorosurfactant Zonyl ® FSN.

TABLE 4

| | | Example 8 | Example 9 | Example 10 |
|---|---|---|---|---|
| | Lubricant | Zonyl ® FSB | Zonyl ® FSB | Zonyl ® FSC |
| | Amount | 50 mls | 75 mls | 50 mls |
| | Reference | N.B. No. 4445 Pages 127-128 | N.B. No. 4445 Pages 127-133 | N.B. No. 4445 Pages 135-140 |
| | Sample Number | 127-12 | 133-31 | 140-25 |
| | Number of Millings: | | 22 | 24 |
| | MILLING STAGE | | | |
| 1. | Prior to milling | Heavy, damp feeling, small lumps | Discolored, feels damp, small lumps | Discolored, cold, small lumps, some powder, obnoxious fishy smell |
| 2. | First pass: ability to form a sheet | Extremely poor. Unable to form a sheet, very powdery, flaky, little cohesion | Low. Sample remains powdery & crumbly, needs much working to form a fragile sheet | Low. Tears readily into strips that won't adhere to one another easily. Much waste |
| 3. | Successive thinning: ability to mill | | Modest, tearing noted, puckering, build up bubbles | Poor. Tears into strips, raggy appearance |
| 4. | Ability to cross mill | | Medium. Tearing, bubbles, cracking noted | Medium, layering evident, puckers & tears present |
| 5. | Ability to mill successive thinning passes | | Very low. Adheres severly to rollers, tearing, puckering, stiff | Low, sample becomes stiff, tears, holes develop, rippling, hesistation in rollers |
| | | Example 11 | Example 12 | Example 13 |
| | Lubricant | Zonyl ® FSP | Triton ® X-100 | Zonyl ® FSN |
| | Amount | 50 mls | 50 mls | 50 mls |
| | Reference | N.B. No. 4445 Pages 141-146 | N.B. No. 4445 Pages 146-151 | N.B. No. 4445 Pages 26-31 |
| | Sample Number | 146-14 | 151-9 | 31-17 |
| | Number of Millings: | 23 | 24 | 25 |
| | MILLING STAGE | | | |
| 1. | Prior to milling | Damp, small lumps, much powder | Dry, grainy, small lumps | Heavy, wet feeling, small lumps |
| 2. | First pass: ability to form a sheet | Poor. Sample remains very powdery & crumbly, needs much working to form a very fragile sheet | Medium. Sample mills into small pieces which can accept fragile sheet form | High, material transforms into a doughy sheet |
| 3. | Successive thinning: ability to mill | Poor, fractures readily, delaminates | Modest, longitudinal cracking, some tearing & ripping on surface of sample | Excellent, mills readily |
| 4. | Ability to cross mill | Modest. Sample becomes firmer, tearing and cracking noted | Medium. Sample soft & flexible. Skin of sample has a tendency to blister | Excellent, no hesitation in rollers a uniform sheet results |
| 5. | Ability to mill successive thinning passes | Poor. Sample becomes brittle, cracking noted, tearing along edges | Medium. Sample is flexible with some puckering & holes developing. Liquid is dispelled on to rollers | Excellent, no resistance offered to milling, a uniform sheet results |

These examples clearly illustrate the specific nature of this invention, with a clear demonstration that not all fluorosurfactants, or all surfactants generally, yield satisfactory results. Example 3 demonstrates the superiority of the nonionic fluorosurfactant as compared to anionic, cationic, and amphoteric fluorosurfactants, and a conventional nonionic surfactant.

The invention has been described in terms of specific embodiments as set forth in detail. Alternative embodiments will be apparent to those skilled in the art in view of this disclosure, and accordingly such modifications are to be contemplated as within the spirit of the invention as disclosed and claimed herein.

What is claimed is:

1. A process for the preparation of a microporous electrolytic cell separator, comprising the steps of:
   (a) blending a dry fluorocarbon polymer powder and a pore forming particulate additive;
   (b) adding an organic nonionic fluorosurfactant lubricant;
   (c) blending said polymer powder, particulate additive and lubricant to a uniform mixture;
   (d) forming said mixture into a sheet;

(e) reducing said sheet to the desired thickness by passing between rollers a plurality of times;
(f) heating said sheet to remove volatile components in the lubricant;
(g) sintering and cooling said sheet material; and
(h) removing the particulate pore forming additive forming a high porosity microporous electrolytic cell separator.

2. The process of claim 1, wherein said fluorocarbon polymer is polytetrafluoroethylene.

3. The process of claim 2 wherein said material is formed into a sheet by passage between the rolls of a roll mill.

4. The process of claim 3 wherein said material is formed into a sheet by extrusion.

5. The process of claim 2, wherein the lubricant is fluoroalkyl poly(ethyleneoxy) ethanol.

6. The process of claim 2 wherein said lubricant is present in an amount of from about 5 to about 30 percent by weight of the mixture.

7. The process of claim 6 wherein said particulate additive and said polymer are present in a weight ratio of from about 10:1 to about 1:1.

8. The process of claim 7 wherein said sheet material is subjected to no more than a single reorientation of 90° between two successive passages between rollers so as to increase biaxial tensile strength.

9. The process of claim 2 wherein said lubricant is present in an amount of from about 18 to about 23 percent by weight of the mixture.

10. The process of claim 9 wherein said particulate additive and said polymer are present in a weight ratio of from about 5:1 to about 1:1.

11. The process of claim 2 wherein said sheet material is heated to a temperature of from about 100° C. to about 250° C. to remove volatilizable components, and sintered at a temperature of from about 340° C. to about 360° C.

12. The process of claim 2 wherein said polymer powder has an average particle size of less than 100 microns.

13. The process of claim 2 wherein the particulate additive is calcium carbonate.

14. The process of claim 12 wherein the particulate additive is removed by leaching with a mineral acid.

15. A chlor-alkali cell separator comprising a microporous polytetrafluoroethylene sheet having high porosity, said separator formed by blending a dry powder of polytetrafluoroethylene and a particulate pore forming additive with a nonionic fluorosurfactant lubricant to a uniform mixture, forming the mixture into a sheet of the desired thickness by sequentially rolling and re-rolling said mixture, drying the sheet to remove volatile components in the lubricant, sintering the polytetrafluoroethylene, and leaching the particulate pore forming additive.

16. A separator as set forth by claim 15 having a porosity of greater than 70 percent.

17. A separator as set forth by claim 15 having a porosity greater than 80 percent.

18. A separator as set forth by claim 15 wherein said mixture comprises from about 5 to about 30 weight percent lubricant, and said particulate additive and said polytetrafluoroethylene are present in a weight ratio of from about 10:1 to about 5:1.

19. A separator as set forth by claim 15 wherein said lubricant is fluoroalkyl poly(ethyleneoxy) ethanol.

20. A separator as set forth in claim 17 wherein said particulate additive is calcium carbonate.

* * * * *